(12) United States Patent
Joly et al.

(10) Patent No.: US 11,885,268 B2
(45) Date of Patent: Jan. 30, 2024

(54) ASSEMBLY FOR A TURBINE ENGINE

(71) Applicant: SAFRAN AIRCRAFT ENGINES, Paris (FR)

(72) Inventors: Philippe Gérard Edmond Joly, Moissy-Cramayel (FR); Jean-Marc Claude Perrollaz, Moissy-Cramayel (FR); Laurent Jablonski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/758,731

(22) PCT Filed: Jan. 6, 2021

(86) PCT No.: PCT/FR2021/050010
§ 371 (c)(1),
(2) Date: Jul. 13, 2022

(87) PCT Pub. No.: WO2021/144519
PCT Pub. Date: Jul. 22, 2021

(65) Prior Publication Data
US 2023/0038378 A1     Feb. 9, 2023

(30) Foreign Application Priority Data
Jan. 13, 2020   (FR) ........................................ 2000259

(51) Int. Cl.
*F01D 15/12*   (2006.01)
*F02C 7/36*   (2006.01)

(52) U.S. Cl.
CPC ..................... *F02C 7/36* (2013.01)

(58) Field of Classification Search
CPC .. F02C 3/107; F02C 7/36; F01D 5/026; F01D 5/025; F01D 5/066; F05D 2260/40311; F05D 2220/36; F04D 29/054
(Continued)

(56) References Cited

U.S. PATENT DOCUMENTS

| 10,662,776 | B2 | 5/2020 | Perrier et al. | |
| 2018/0334907 | A1* | 11/2018 | Perrier | F04D 29/054 |
| 2020/0102888 | A1* | 4/2020 | Stevenson | F02C 7/232 |

FOREIGN PATENT DOCUMENTS

| EP | 3 514 325 A1 | 7/2019 |
| FR | 3 066 552 A1 | 11/2018 |
| WO | 00/46489 A1 | 8/2000 |

OTHER PUBLICATIONS

International Search Report dated Mar. 5, 2021, issued in corresponding International Application No. PCT/FR2021/050010, filed Jan. 6, 2021, 5 pages.
(Continued)

*Primary Examiner* — Long T Tran
*Assistant Examiner* — James J Kim
(74) *Attorney, Agent, or Firm* — CHRISTENSEN O'CONNOR JOHNSON KINDNESS PLLC

(57) ABSTRACT

An assembly for a turbine engine extending along an axis, includes a stator, a low-pressure compressor shaft, a low-pressure compressor comprising a rotor comprising a drum rotatably coupled to the shaft of the low-pressure compressor, and a fan comprising a disk rotatably coupled to the shaft of the low-pressure compressor. The drum has a radially internal part rotatably coupled to the shaft of the low-pressure compressor and a radially external part fixed to the radially internal part by means of detachable fixing means. A first axial retention means is configured to axially and detachably retain the disk of the fan relative to the shaft of the low-pressure compressor. A second axial retention
(Continued)

means is configured to axially and detachably retain the radially internal part of the drum relative to the shaft of the low-pressure compressor.

9 Claims, 2 Drawing Sheets

(58) Field of Classification Search
USPC .................................................. 415/122.1
See application file for complete search history.

(56) References Cited

OTHER PUBLICATIONS

Written Opinion dated Mar. 5, 2021, issued in corresponding International Application No. PCT/FR2021/050010, filed Jan. 6, 2021, 5 pages.
English translation of Written Opinion dated Mar. 5, 2021, issued in corresponding International Application No. PCT/FR2021/050010, filed Jan. 6, 2021, 5 pages.
International Preliminary Report on Patentability dated Jul. 19, 2022, issued in corresponding International Application No. PCT/FR2021/050010, filed Jan. 6, 2021, 6 pages.

* cited by examiner

ASSEMBLY FOR A TURBINE ENGINE

FIELD OF THE DISCLOSURE

The disclosure relates to an assembly for a turbine engine, such as in particular an aircraft turbo prop or a turbo fan.

BACKGROUND

A turbine engine conventionally includes, from upstream to downstream with respect to the direction of circulation of the gases within the turbine engine, a fan, a low-pressure compressor, a high-pressure compressor, a combustion chamber, a high-pressure turbine, a low-pressure turbine, and an exhaust pipe.

The rotor of the high-pressure turbine and the rotor of the high-pressure compressor are coupled in rotation via a first shaft in such a way as to form a high-pressure body.

The rotor of the low-pressure turbine and the rotor of the low-pressure compressor are coupled in rotation via a second shaft in such a way as to form a low-pressure body, the fan configured to being directly connected to the rotor of the low-pressure compressor or via an epicyclical gear assembly for example.

Document FR 3 066 552 in the name of the Applicant discloses an assembly for a turbine engine extending along an axis, including a stator, a shaft of the low-pressure compressor, a low-pressure compressor including a rotor comprising a drum coupled in rotation to the shaft of the low-pressure compressor and a fan including a disc coupled in rotation to the shaft of the low-pressure compressor.

The structure presented in this document is relatively compact but requires in particular the disassembly of the assembly of the rotor of the low-pressure compressor in order to access possible elements located around the shaft of the low-pressure compressor and located downstream from the drum. Such a structure does not moreover make it possible to effectively retain the drum in case of disassembly of the fan disc.

The disclosure aims to overcome these disadvantages simply, reliably, and inexpensively.

SUMMARY

To this effect, the disclosure relates to an assembly for a turbine engine extending along an axis, including a stator, a low-pressure compressor shaft, a low-pressure compressor including a rotor comprising a drum coupled in rotation to the shaft of the low-pressure compressor, a fan including a disc coupled in rotation to the shaft of the low-pressure compressor, characterised in that the drum includes a radially internal portion coupled in rotation to the shaft of the low-pressure compressor and a radially external portion fixed to the radially internal portion via removable fixing means, first axial retention means configured to retain axially and removably the fan disc with respect to the shaft of the low-pressure compressor, second axial retention means configured to retain axially and removably the radially internal portion of the drum with respect to the shaft of the low-pressure compressor.

The terms axial, radial and circumferential are defined with respect to the axis of the turbine engine, which is confounded with the axis of the shaft of the low-pressure compressor in particular.

Such an assembly makes it possible to be configured to disassemble easily the fan disc and the internal portion of the drum of the low-pressure compressor, to authorize an access from the upstream of the turbine engine, to any elements located downstream from the drum and of the fan disc, during a possible maintenance operation, without requiring disassembly of the external portion of the drum.

For this, it is sufficient to remove the first and second removable axial retention means in such a way as to authorize the disassembly of the fan disc and of the internal portion of the drum of the low-pressure compressor.

During such a disassembly, the external portion of the drum can be maintained using an adapted tool.

Such a structure can also allow for the disassembly of the fan disc alone while still providing the retaining in position of the drum, via second axial retention means.

The drum of the low-pressure compressor can be located downstream from the fan disc.

The terms upstream and downstream are defined with respect to the direction of circulation of the gases within the turbine engine.

The removable fixing means between the internal and external portions of the drum can include at least one bolt, for example several bolts regularly distributed over the circumference.

The internal portion of the drum can include a radial annular portion fixed to a radial annular portion of the external portion of the drum, via removable fixing means.

The means for coupling in rotation the disc of the fan with respect to the shaft of the low-pressure compressor can include splines.

The fan disc can include a cylindrical zone including splines engaging with additional splines of a cylindrical zone of the shaft of the low-pressure compressor.

The splines can extend axially. The splines can authorize an assembly and an axial disassembly of the fan disc with respect to the shaft of the low-pressure compressor.

The means for coupling in rotation the internal portion of the drum with respect to the shaft of the low-pressure compressor can include splines.

The internal portion of the drum can include a cylindrical zone including splines engaging with additional splines of a cylindrical zone of the shaft of the low-pressure compressor.

The splines can extend axially. The splines can authorize an assembly and an axial assembly of the internal portion of the drum with respect to the shaft of the low-pressure compressor.

The cylindrical zones provided with splines of the shaft of the low-pressure compressor, of the internal portion of the drum and of the fan disc can be located, at least partially, in the same radial plane.

Such a characteristic makes it possible in particular to prevent stressing in compression the splines during the setting in place of the axial retention means.

The shaft of the low-pressure compressor can include radially internal splines, engaging with additional splines of the fan disc.

The shaft of the low-pressure compressor can include radially external splines, engaging with additional splines of the internal portion of the drum.

The means for coupling in rotation the internal portion of the drum with respect to the shaft of the low-pressure compressor can include teeth extending in a radial plane. The internal portion of the drum can include an annular zone extending radially including teeth engaging with additional teeth of a radial annular zone of the shaft of the low-pressure compressor.

The teeth can be straight or curved.

The teeth can authorize an assembly and an axial disassembly of the internal portion of the drum with respect to the shaft of the low-pressure compressor.

The teeth can be formed at a downstream end of the internal portion of the drum and at an upstream end of the shaft of the low-pressure compressor.

The teeth can be formed in a zone located upstream from splines allowing to couple in rotation the shaft of the low-pressure compressor and of the fan disc.

The first axial retention means can include a first stop configured to prevent the displacement of the fan disc with respect to the shaft of the low-pressure compressor in a first direction and a first nut configured to form a second removable stop designed to prevent the displacement of the fan disc with respect to the shaft of the low-pressure compressor, in a second direction, opposite the first direction.

The first stop can be formed by a radial shoulder arranged in the shaft of the low-pressure compressor, the fan disc axially bearing on the radial shoulder. The downstream end of the fan disc can axially bear on the shoulder.

The first nut can include a portion axially bearing on the fan disc and a screwed portion on the shaft of the low-pressure compressor, or inversely.

The first axial retention means can include anti-rotation means preventing the rotation of the nut in the direction of the unscrewing thereof. The anti-rotation means can have the form of a ring including a portion coupled in rotation to the nut and a portion coupled in rotation to a fixed element with respect to the nut, for example coupled in rotation to the fan disc. The ring can be axially retained via an elastic ring, engaged for example in a groove of the fixed element. The second axial retention means can include a second stop configured to prevent the displacement of the internal portion of the drum with respect to the shaft of the low-pressure compressor in a first direction and a second nut configured to form a second removable stop configured to prevent the displacement of the internal portion of the drum with respect to the shaft of the low-pressure compressor, in a second direction, opposite the first direction.

The second stop can be formed by a radial shoulder arranged in the shaft of the low-pressure compressor, the internal portion of the drum axially bearing on the radial shoulder. The downstream end of the internal portion of the drum can axially bear on the shoulder.

The second stop can be formed by axial bearing of the radial zones including the coupling teeth between the internal portion of the drum and the shaft of the low-pressure compressor.

The first nut can include a portion axially bearing on the fan disc and a screwed portion on the shaft of the low-pressure compressor, or inversely.

The assembly can include dynamic sealing means between the stator and the shaft of the low-pressure compressor, located downstream from the internal portion of the drum and of the fan disc.

Such sealing means can be configured to delimit the upstream of an oil enclosure of the turbine engine.

The structure according to the disclosure makes it possible to easily access the sealing means from the upstream of the turbine engine, by removal of the internal portion of the drum and of the fan disc.

The fan can include a blisc. A blisc, or IBR, is an assembly including a disc and blades extending from the disc and formed of a single piece with the disc.

In such a case, in case of damage of one of the blades, it is necessary to disassemble and change the assembly of the blisc. It is therefore particularly useful that a disassembly of such an assembly can be carried out easily.

The disclosure also relates to a turbine engine including at least one assembly of the aforementioned type.

The turbine engine can be an aircraft turbo prop or a turbo fan.

The disclosure also relates to an aircraft including at least one turbine engine of the aforementioned type.

DETAILED DESCRIPTION

Figure 1:
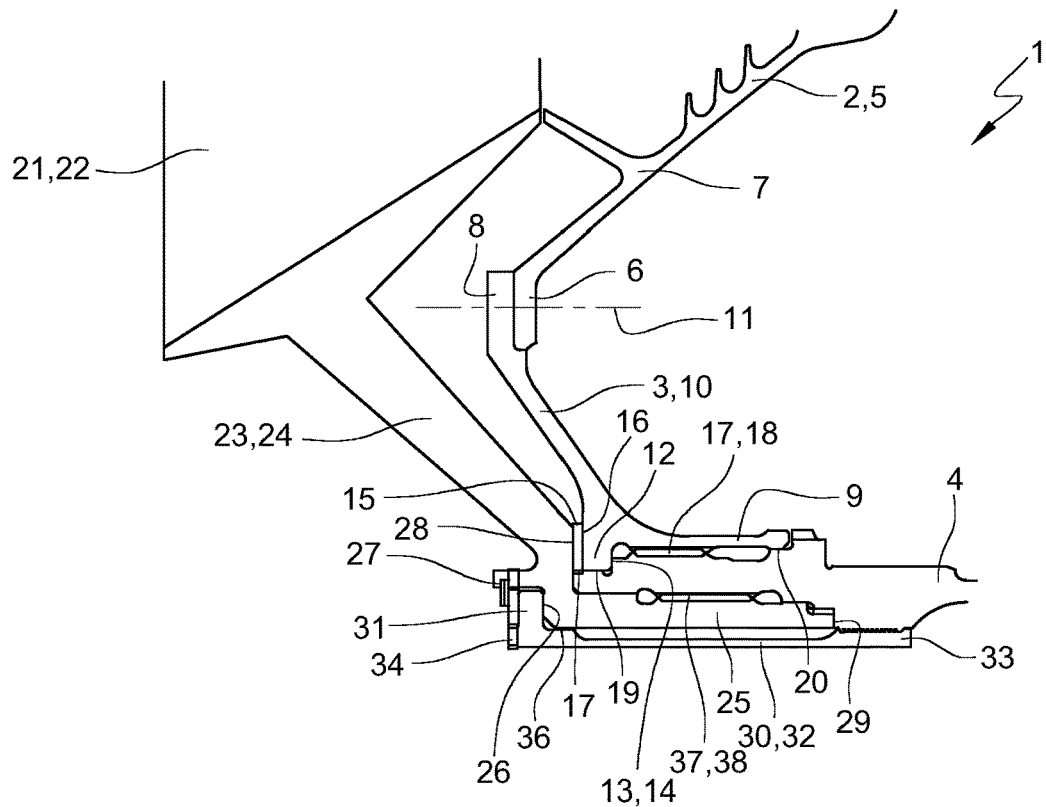
FIG. 1 is an axial cross-section half-view of a portion of an assembly according to a first embodiment of the disclosure.

FIG. 1 shows an assembly for a turbine engine according to a first embodiment of the disclosure. The latter includes a low-pressure compressor comprising a rotor comprising a drum 2 coupled in rotation to a shaft of the low-pressure compressor.

The drum 2 includes a radially internal portion 3 coupled in rotation to a shaft 4 of the low-pressure compressor and a radially external portion 5.

The radially external portion 5 includes a radially internal zone 6 of annular shape and extending radially, and a frustoconical zone 7 extending from the internal zone 6 by flaring in the downstream direction, i.e. to the right in the figures.

The internal portion 3 includes a radially external zone 8 of annular shape extending radially, a radially internal zone 9 of cylindrical shape and a median zone connecting the internal and external zones, here of frustoconical shape.

The radial annular zones 6, 8 are fixed to one another via removable fixing means, for example via bolts 11 (diagrammatically shown in FIG. 1 by mixed lines) regularly distributed over the circumference.

The internal cylindrical zone 9 includes an edge 12 extending radially inwards from the upstream end of the cylindrical zone 9, the edge 12 forming an annular shoulder 13 configured to bear axially on an additional annular shoulder 14 of the shaft of the low-pressure compressor 4.

The axial bearing is retained via a nut 15 that is axially thrust on the edge 12, in particular on the upstream radial face 16 of the edge 12 and screwed on a threaded zone 17 of the upstream end of the shaft 4.

The radially internal surface of the cylindrical zone 9 further includes axial splines 17 extending downstream from the shoulder, engaging with additional splines 18 arranged at the radially external surface of the shaft 4.

The radially internal surface of the edge 12 and the radially internal surface of the downstream end of the cylindrical zone form cylindrical seats 19, 20 engaging with additional cylindrical seats of the shaft 4, the seats 19, 20 being configured to provide a centring of the internal portion 3 of the drum 2 on the shaft 4.

The assembly 1 further includes a fan 21 comprising blades 22 integral with a disc 23 (blisc), the disc 23 being coupled in rotation to the low-pressure compressor shaft 4.

The disc 23 includes a frustoconical portion 24 narrowing in the downstream direction and extended downstream by a cylindrical portion 25.

The upstream end of the cylindrical portion 25 includes an annular reinforcement opening radially inwards and delimiting an annular shoulder 26. A groove 27 is formed in the radially internal surface of the cylindrical portion 25, upstream from the shoulder 26.

A radially external shoulder 28 is moreover formed between the frustoconical zone 24 and the cylindrical zone 25 of the disc 23. The nut 15 is axially inserted between the external shoulder 28 and the upstream radial face 16 of the edge 12.

The shoulder 28 axially bears on the nut 15. Alternatively, the downstream end of the cylindrical portion 25 of the disc 23 axially bears on a radially internal annular shoulder 29 of the shaft 4.

Such a bearing is retained via a nut 30 including an upstream radial edge 31 bearing on the shoulder 26 and a cylindrical portion 32 the downstream end 33 of which is threaded and engaged with a tapping of the radially internal surface of the shaft 4, located downstream from the shoulder 26.

The nut 30 is retained in position via a ring 34 coupled in rotation to the nut 30, for example via a finger and notch system, the ring 34 also being coupled in rotation with the fan disc 23, for example via a finger and notch system.

The ring 34 is axially retained in position via an elastic ring 35 or circlips, engaged in the groove 27.

The nut 30 and the cylindrical portion of the disc 25 include moreover additional cylindrical seats 36 facilitating the centring of the nut 30, and located downstream from the upstream edge 31.

The cylindrical portion 25 of the disc 23 includes in addition axial splines 37, formed at the radially external surface of the cylindrical portion 25, cooperating with additional splines 38 arranged at the radially internal surface of the shaft 4.

Figure 2:
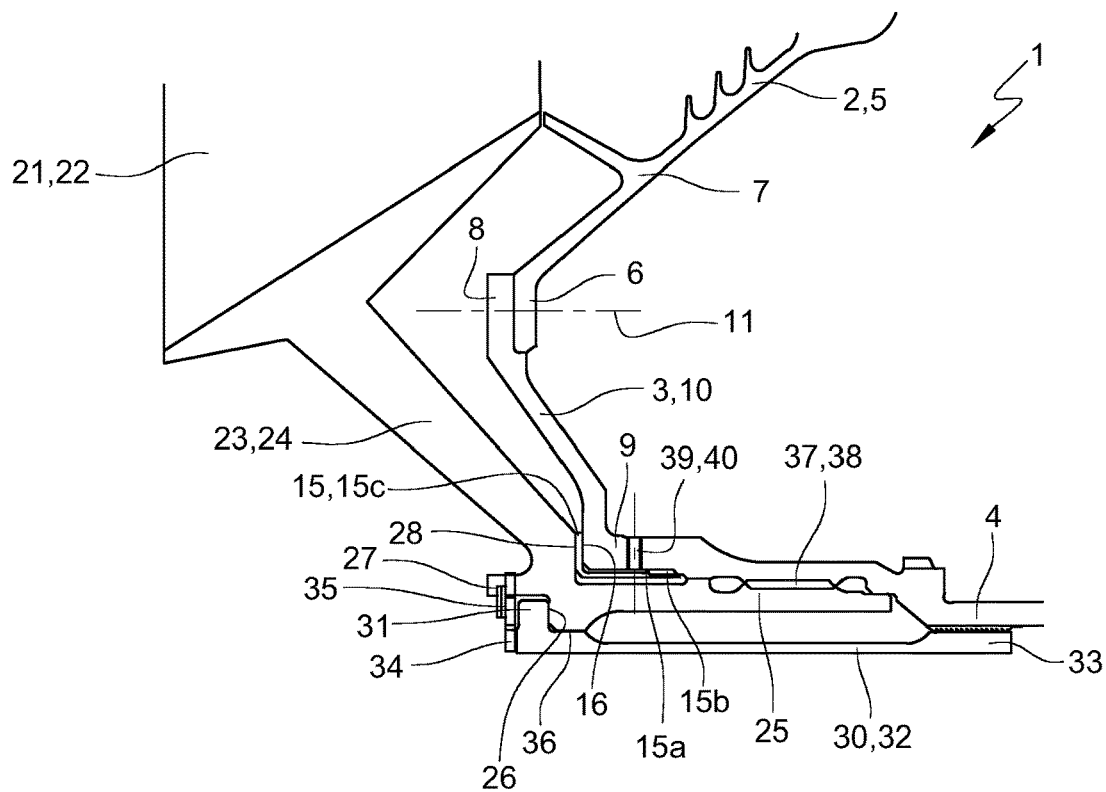
FIG. 2 is an axial cross-section half-view of a portion of an assembly according to a second embodiment of the disclosure.
Figure 3:
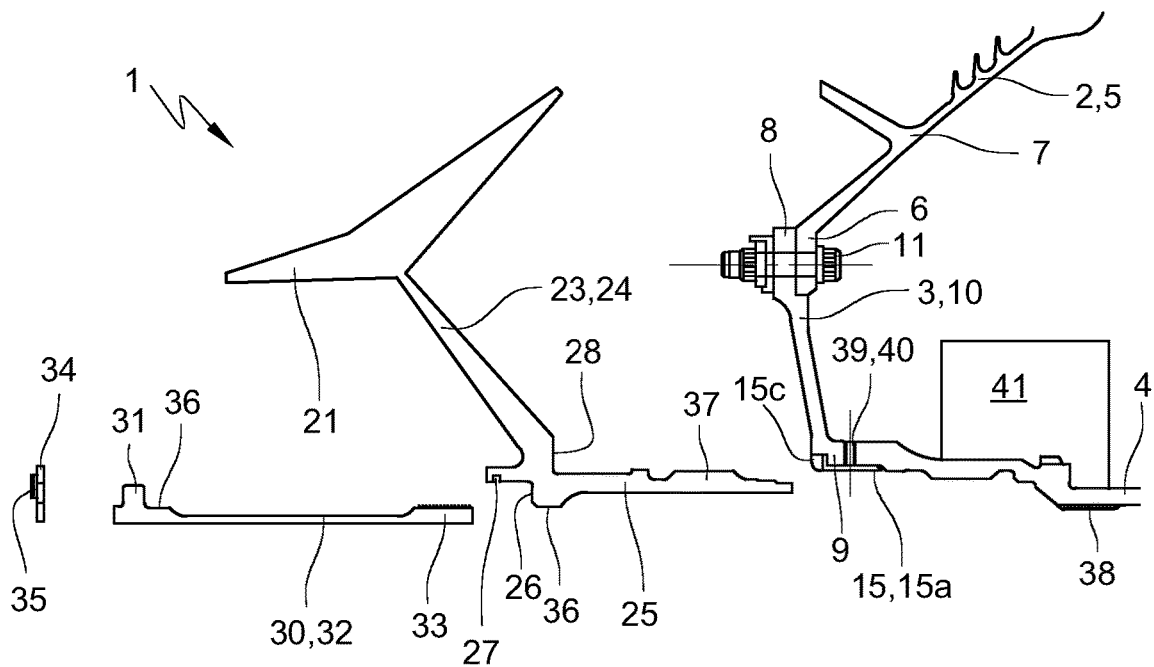
FIG. 3 is a partially exploded view of the assembly of FIG. 2.
Figure 4:
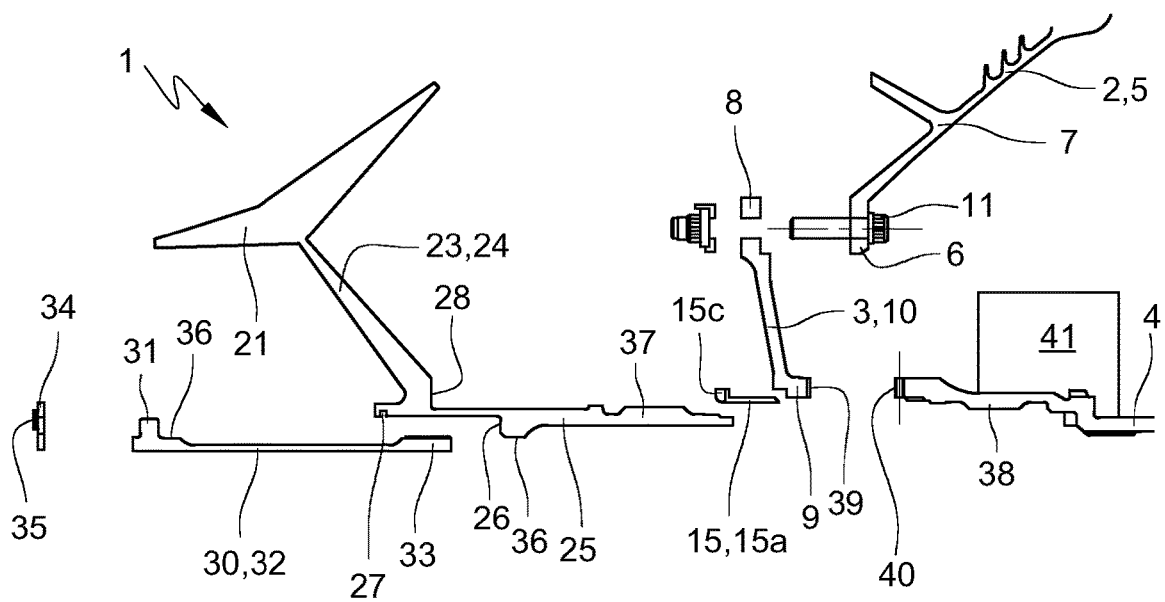
FIG. 4 is an exploded view of the assembly of FIG. 2.

The splines 17, 18 and 37, 38 are located on the same radial plane, at least in part. FIGS. 2 to 4 show an assembly according to a second embodiment of the disclosure, which differs from the one disclosed in reference to FIG. 1 in that the internal portion 3 of the drum 2 is coupled in rotation to the shaft 4 via teeth 39, 40 formed respectively at the radial annular surface of the downstream end of the internal portion 3 of the drum 2 and at the radial annular surface of the upstream end of the shaft 4.

The teeth 39, 40 can extend axially, either in a straight manner, or in a curved manner. In this embodiment, the nut 15 includes a cylindrical portion 15a the downstream end of which is threaded 15b and is screwed on a tapping of the shaft 4. The nut 15 includes moreover an edge 15c extending radially from the upstream end of the cylindrical portion 15a, the edge 15c bearing on the radial face 16 or on a radial shoulder of the internal portion 3 of the drum 2.

Such an assembly 1 makes it possible to be configured to disassemble easily the fan disc 23 and the internal portion 3 of the drum 2 with respect to the shaft 4 of the low-pressure compressor, to authorize access from the upstream of the turbine engine, to possible elements located downstream from the drum and of the fan disc, during a possible maintenance operation, without requiring disassembly of the external portion 5 of the drum 2. Such elements are for example dynamic sealing means 41 between a stator of the assembly and the shaft 4 of the low-pressure compressor, located downstream from the internal portion 3 of the drum 2 and of the fan disc 23. Such sealing means 41 are diagrammatically shown in FIGS. 3 and 4. Such sealing means 41 can be configured to delimit the upstream of an oil enclosure of the turbine engine.

In order to allow such an access, it is sufficient to remove the nuts 15, 30 and the bolts 11 in such a way as to authorize the disassembly of the fan disc 23 and of the internal portion 3 of the drum 2 with respect to the shaft 4, by translation according to the axis X.

The structure according to the disclosure then makes it possible to easily access the sealing means 41 from the upstream of the turbine engine, by removing the internal portion 3 of the drum 2 and of the fan disc 23.

During such a disassembly, the external portion 5 of the drum 2 can be retained using an adapted tool.

Such a structure can also allow for the disassembly of the fan disc 23 alone while still providing the retaining in position of the drum 2, via the nut 15.

The invention claimed is:

1. An assembly for a turbine engine extending along an axis, including a stator, a low-pressure compressor shaft, a low-pressure compressor including a rotor comprising a drum coupled in rotation to the shaft of the low-pressure compressor, a fan including a disc coupled in rotation to the shaft of the low-pressure compressor, wherein the drum comprises a radially internal portion coupled in rotation to the shaft of the low-pressure compressor and a radially external portion fixed to the radially internal portion via removable fixing means, first axial retention means being configured to axially and removably retain the fan disc with respect to the shaft of the low-pressure compressor, second axial retention means configured to axially and removably remove the radially internal portion of the drum with respect to the shaft of the low-pressure compressor, wherein the first axial retention means include a first stop configured to prevent a displacement of the fan disc with respect to the shaft of the low-pressure compressor in a first direction and a first nut configured to form a second removable stop designed to prevent the displacement of the fan disc with respect to the shaft of the low-pressure compressor, in a second direction, opposite the first direction.

2. The assembly according to claim 1, wherein means for coupling in rotation the disc of the fan with respect to the shaft of the low-pressure compressor include splines.

3. The assembly according to claim 1, wherein means for coupling in rotation the internal portion of the drum with respect to the shaft of the low-pressure compressor include splines.

4. The assembly according to claim 1, wherein means for coupling in rotation the internal portion of the drum with respect to the shaft of the low-pressure compressor include teeth extending in a radial plane.

5. The assembly according to claim 1, wherein the second axial retention means include a second stop configured to prevent a displacement of the internal portion of the drum with respect to the shaft of the low-pressure compressor in a first direction and a second nut capable of forming a second removable stop capable of preventing the displacement of the internal portion of the drum with respect to the shaft of the low-pressure compressor, in a second direction, opposite the first direction.

6. The assembly according to claim 1, further comprising dynamic sealing means between the stator and the shaft of the low-pressure compressor, located downstream from the internal portion of the drum and of the fan disc.

7. The assembly according to claim 1, wherein the fan includes a blisc.

8. A turbomachine, comprising at least one assembly according to claim 1.

9. An aircraft, comprising at least one turbine engine according to claim 8.

\* \* \* \* \*